United States Patent
Rosemeier et al.

(10) Patent No.: US 7,601,086 B2
(45) Date of Patent: Oct. 13, 2009

(54) VEHICLE WITH A DRIVE ENGINE ARRANGED IN THE TRANSVERSE DIRECTION OF THE VEHICLE

(75) Inventors: Thomas Rosemeier, Meckenbeuren (DE); Christoph Pelchen, Tettnang (DE); Ulrich Mair, Friedrichshafen (DE); Detlef Baasch, Ailingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 257 days.

(21) Appl. No.: 11/582,081

(22) Filed: Oct. 17, 2006

(65) Prior Publication Data
US 2007/0087886 A1 Apr. 19, 2007

(30) Foreign Application Priority Data
Oct. 18, 2005 (DE) .............. 10 2005 049 707

(51) Int. Cl.
*B60K 6/02* (2006.01)
(52) U.S. Cl. .............................. 475/5; 475/6
(58) Field of Classification Search ............ 475/150, 475/206, 5, 6; 903/911, 916; 180/65.2, 65.3, 180/65.4; 477/3–5; F16H 48/04
See application file for complete search history.

(56) References Cited

U.S. PATENT DOCUMENTS

| | | | | |
|---|---|---|---|---|
| 5,409,425 | A | * | 4/1995 | Shibahata .................. 475/5 |
| 5,509,491 | A | * | 4/1996 | Hall, III .................. 180/9.44 |
| 6,491,599 | B1 | * | 12/2002 | Schmidt .................. 475/5 |
| 6,705,416 | B1 | | 3/2004 | Glonner et al. |
| 7,111,702 | B2 | * | 9/2006 | Perlick et al. ............ 180/233 |
| 7,410,437 | B2 | * | 8/2008 | Garnett .................... 475/5 |
| 2003/0221883 | A1 | * | 12/2003 | Kubodera et al. ........ 180/65.2 |
| 2004/0220011 | A1 | * | 11/2004 | Gumpoltsberger et al. .. 475/205 |
| 2005/0061567 | A1 | * | 3/2005 | Kim .................... 180/243 |
| 2005/0107198 | A1 | * | 5/2005 | Sowul et al. ............ 475/5 |
| 2007/0015618 | A1 | * | 1/2007 | Baasch et al. ............ 475/5 |
| 2007/0249456 | A1 | * | 10/2007 | Meixner .................. 475/150 |

FOREIGN PATENT DOCUMENTS

| | | |
|---|---|---|
| DE | 19917665 A1 * | 10/2000 |
| DE | 199 39 814 A1 | 2/2001 |
| DE | 103 48 960 A1 | 5/2005 |

* cited by examiner

*Primary Examiner*—Sherry L Estremsky
*Assistant Examiner*—Erin D Bishop
(74) *Attorney, Agent, or Firm*—Davis & Bujold, P.L.L.C.

(57) ABSTRACT

A vehicle is described, with a drive engine arranged in the transverse direction of the vehicle, with vehicle cross-shafts of a vehicle axle that can be driven by the drive engine and with a transmission unit for the variable distribution of the drive torque from the drive engine in the vehicle's transverse direction between wheels connected to the vehicle cross-shafts. The transmission unit has an input shaft and two output shafts, with two planetary gearsets and an electric machine arranged between two interconnected shafts of the planetary gearsets for the variable distribution of the torque delivered by the input shaft between the two output shafts as a function of torque produced by the electric machine. The electric machine is brought into active connection with the transmission unit and with the drive engine via shiftable clutch devices such that the degree of distribution between the output shafts of the transmission unit can be varied when the electric machine is operating as a motor and as a generator. The electric machine can be driven directly by the drive engine to operate as a generator.

6 Claims, 2 Drawing Sheets

VEHICLE WITH A DRIVE ENGINE ARRANGED IN THE TRANSVERSE DIRECTION OF THE VEHICLE

This application claims priority from German Application Ser. No. 10 2005 049 707.1 filed Oct. 18, 2005.

FIELD OF THE INVENTION

The invention concerns a vehicle with a drive engine arranged in the transverse direction of the vehicle.

BACKGROUND OF THE INVENTION

From DE 103 48 960 A1, a transmission unit with at least two three-shaft planetary gearsets is known, for the distribution of a transmission input torque to at least two transmission output shafts. A respective shaft of one planetary gearset is connected to the transmission input shaft. In addition, a respective shaft of each planetary gearset constitutes one of the transmission output shafts and at least one other shaft of each planetary gearset is in active connection with a shaft of the other planetary gearset.

The active connection between the interconnected shafts of the planetary gearsets comprises a third planetary gearset, an annular gear of the third planetary gearset being connected with the one shaft, that of the first planetary gearset, and a solar gear with the other shaft, that of the second planetary gearset. Furthermore, a satellite gear of the third planetary gearset is fixed to and able to rotate on the housing and another satellite gear is in rotationally fixed connection with an output shaft of an electric machine.

Accordingly, an operating-condition-dependent torque of one shaft of the first or second planetary gearset can be supported via the active connection as a function of an operating condition of the respective other shaft of the second or first planetary gearset actively connected to it, in such manner that if a speed difference occurs between the output shafts of the transmission unit, a torque that changes this speed difference is applied to the planetary gearsets by virtue of the active connection.

Owing to the active connection between two shafts of the first two planetary gearsets and the possibility, in the area of the active connection, of imposing a torque from the electric machine in the area between the interconnected shafts of the two planetary gearsets, a drive torque from a drive engine of a drive train in a vehicle can be distributed in the vehicle's longitudinal direction between two axles of the vehicle, or in the vehicle's transverse direction between the wheels of one axle of a vehicle, with a variable degree of distribution.

DE 199 17 665 A1 discloses a hybrid drive for a vehicle, which has a first electric machine and a second electric machine permanently connected to a transmission input shaft, in a drive train between a combustion engine and a multi-speed vehicle transmission. Between the electric machines, each of which can be operated as a motor and as a generator, and the combustion engine, a clutch that can be engaged is arranged in each case.

The first electric machine is provided for starting the combustion engine and the second electric machine primarily for starting the vehicle off under electric power when the combustion engine is uncoupled. In addition, the second electric machine can also be operated as a starter for the combustion engine or as a generator for the electrical system, i.e., for charging the battery or to produce electric power for other consumers and to drive the hydraulic pump of the vehicle transmission and, if necessary, to drive other auxiliary aggregates, such as the climatization compressor, the power steering pump, the braking force amplifier, or the water pump.

The disadvantage of this, however, is that the total weight of the vehicle is large, owing to the presence of two electric machines.

If it is desired to distribute the drive torque provided by the hybrid drive in the vehicle's longitudinal direction between the axles of the vehicle or in the vehicle's transverse direction between the wheels of one axle with a variable degree of distribution, for example, there is the possibility of constructing the multi-speed vehicle transmission in the manner proposed in DE 103 48 960 A1.

However, because of the electric machine integrated in the transmission unit, this again leads to an increase of the vehicle's weight, which results in higher fuel consumption.

Accordingly, the purpose of the present invention is to provide a vehicle with low vehicle weight, in which a drive torque can be distributed with a variable degree of distribution in the vehicle's longitudinal direction between two vehicle axles or in its transverse direction between the wheels on a vehicle axle.

SUMMARY OF THE INVENTION

The vehicle, according to the invention, with a drive engine arranged in the vehicle's transverse direction and vehicle cross-shafts of a vehicle axle that can be driven by the engine, is built with a transmission unit for the variable distribution of the drive torque from the engine in the vehicle's transverse direction between the wheels connected to the vehicle cross-shafts. The transmission unit is made with a transmission input shaft and two transmission output shafts, with two planetary gearsets and with an electric machine arranged between two interconnected shafts of the planetary gearsets for the variable distribution of the torque coming from the transmission input shaft between the two transmission output shafts as a function of a torque produced by the electric machine.

According to the invention, the electric machine can be brought into active connection, via shiftable clutch devices, with both the transmission unit and the drive engine in such manner that the degree of distribution between the output shafts of the transmission unit when the electric machine is operating as a motor or as a generator can be varied, and the electric machine can be driven directly by the engine to operate as a generator. The electrical energy produced during this can preferably be stored in an electricity storage medium.

Thanks to the arrangement of the electric machine and the transmission device, according to the invention, and to the shiftable clutch devices provided between the electric machine and the drive engine, the electric machine can be used both to vary the degree of distribution of the transmission input torque between the two transmission output shafts and also as the electric component of a hybrid vehicle drive system.

Thus, the electric machine provided in order to vary the degree of distribution of the drive torque from the engine between two wheels of a vehicle axle or between two vehicle axles additionally performs the function of a so-termed generator provided in conventional vehicles.

As a result, in a simple way one less electric machine, i.e., the generator, is needed. This reduces the vehicle's weight and also leaves space free in the engine compartment of the vehicle for other vehicle components.

BRIEF DESCRIPTION OF THE DRAWINGS

The invention will now be described, by way of example, with reference to the accompanying drawings in which.

DETAILED DESCRIPTION OF THE INVENTION

Figure 1:
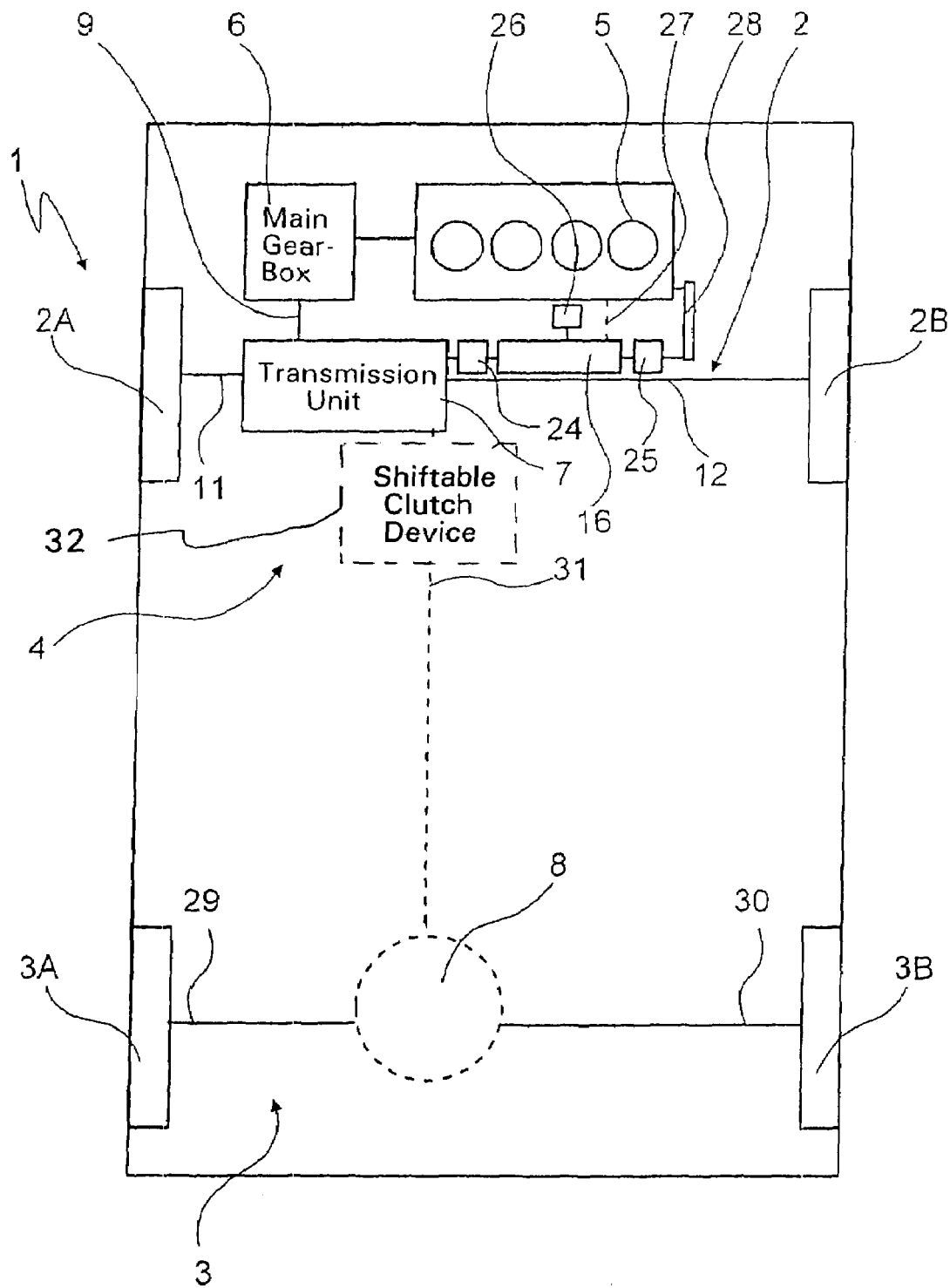
FIG. 1 is a schematic representation of a drive train of a vehicle.

FIG. 1 shows a schematic representation of a vehicle 1 with two vehicle axles 2, 3, such that when the vehicle 1 is made as a front-transverse drive vehicle the vehicle axle 2, or when the vehicle 1 is made as an all-wheel drive vehicle both vehicle axles 2 and 3, are part of a drive train 4 of the vehicle 1. The drive train 4 also comprises a drive engine or an internal combustion engine 5, whose crankshaft (not shown in detail) extends transversely across the vehicle. In addition, the drive train 4 is made with a main gearbox 6, which can be any gearbox known in practice and is provided in order to engage various stepped and/or continuously adjustable transmission ratios.

Between the main gearbox 6 and the vehicle axles 2, 3 of the vehicle 1, which in a known way are connected on each side of the vehicle to at least one drive wheel 2A, 2B or 3A, 3B respectively, is arranged a transmission unit 7 for distributing the drive torque from the drive engine 5 or the transmission output torque from the main gearbox 6 in the vehicle's transverse direction between the two wheels 2A and 2B on the axle 2, when the vehicle 1 is only designed as a front-transverse-driven vehicle.

In addition, if part of the transmission output torque from the main gearbox 6 is also to be delivered in the direction of the axle 3 constituting the vehicle's rear axle, the all-wheel-drive is implemented as a so-termed "hang-on" solution in which the fraction of the transmission output torque from the main gearbox 6 to be delivered to the vehicle axle 3 is passed towards the axle 3 with a fixed degree of distribution determined by design, this being represented graphically in FIG. 1 by the part of the drive train 4 indicated with broken lines. In that case, cross-shafts 29, 30 of the vehicle axle 3 can be connected to the drive engine, for example via a vehicle longitudinal shaft 31 which can be engaged by a shiftable clutch device 32.

In contrast to the variable distribution of that part of the transmission output torque from the main gearbox 6, which is delivered to the axle 2 between the wheels 2A and 2B, the part of the output torque from the main gearbox 6 delivered to the vehicle axle 3 in the vehicle 1 shown in FIG. 1 is distributed by a device 8 provided in the area of the axle 3 in order to equalize speed differences between the wheels 3A and 3B on the vehicle axle 3. In the present case, the device 8 is made as a transverse transfer box or axle transmission by way of which the drive torque delivered to the vehicle axle 3 is distributed in the transverse direction in essentially equal parts between the two wheels 3A and 3B.

The device 8 is made as a transverse transfer box or axle transmission known in itself, which enables the drive wheels 3A and 3B on the vehicle axle to be driven independently of one another at different speeds in accordance with the different path lengths of the left and right tracks, whereby the drive torque can be distributed symmetrically and thus without any yaw torque between the two drive wheels on the vehicle axle 3.

Alternatively, the device 8 can, of course, be made as a transmission unit by way of which the fraction of the transmission output torque from the main gearbox 6 delivered to the vehicle axle 3 can be distributed between the two wheels 3A and 3B with degrees of distribution that can be adjusted in an operating-condition-dependent way, i.e., variably.

Figure 2:
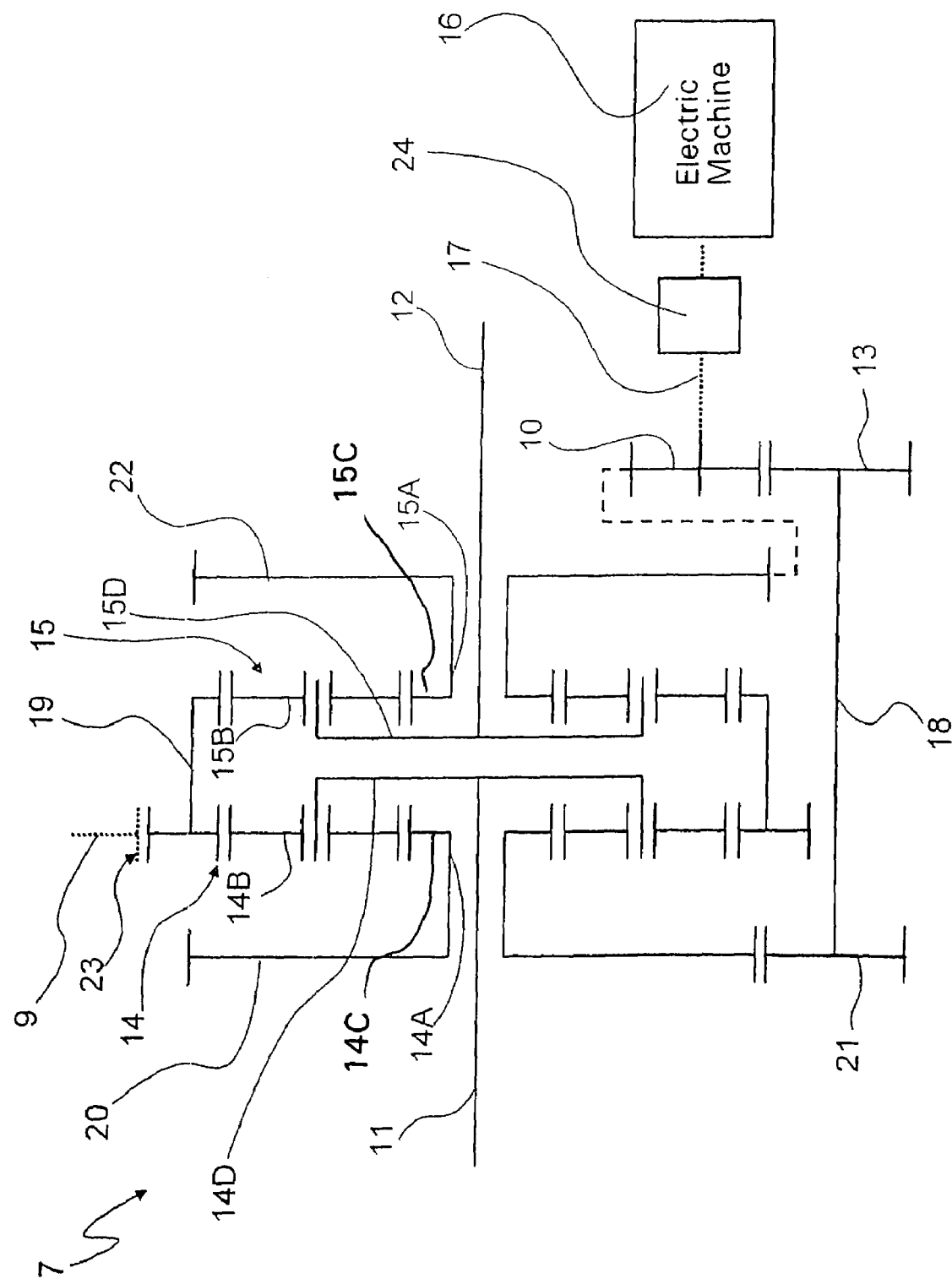
FIG. 2 is a gearing layout of a transmission unit made as an overlap transmission, formed with an electric machine for the variable distribution of the torque delivered by the transmission input shaft between two transmission output shafts.

FIG. 2 shows a gearing layout of the transmission unit 7, illustrated only schematically in FIG. 1, with a transmission input shaft 9 and the two transmission output shafts 11 and 12, with two planetary gearsets 14 and 15 and with an electric machine 16 arranged between two actively interconnected shafts 14A and 15A of the planetary gearsets 14 and 15, for the variable distribution of the torque delivered by the transmission input shaft 9 between the transmission output shafts 11 and 12. The hang-on solution described earlier for connecting the vehicle axle 3 to the drive train 4 of the vehicle 1 is not illustrated in greater detail in FIG. 2.

The gearing layout of the overlap transmission or transmission unit 7 represented in FIG. 2 is a transmission variation with a double planetary gearset, in which the electric machine 16 can be conveniently arranged outside the transmission housing.

The transmission output shafts 11 and 12 or vehicle cross-shafts of the axle 2 are respectively in active connection with the wheels 2A and 2B of the vehicle axle 2 and are in rotationally fixed connection with webs 14D and 15D of the two planetary gearsets 14 and 15. Mounted to rotate on the webs 14D and 15D are satellite gears 14B and 15B, which mesh with solar gears 14C and 15C and with an integrally formed, common annular gear 19 of the two planetary gearsets 14 and 15.

The solar gear 14C of the first planetary gearset is connected to a first spur gear 20, which meshes with another spur gear 21 of a countershaft 18. The solar gear 15C of the second planetary gearset 15 is also connected to a spur gear 22, which meshes with a gear wheel 10 rotationally fixed to a motor output shaft 17 of the electric machine 16, which is, in turn, engaged with another gear wheel 13 of the countershaft 18.

The transmission output torque from the main gearbox 6 delivered to the transmission input shaft 9 is passed via a spur gearing 23 to the common annular gear 19 of the first and second planetary gearsets 14 and 15. From there, the transmission output torque from the main gearbox 6 passes to the satellite gears 14B and 15B engaged with the annular gear 19, which are mounted to rotate on the webs 14D and 15D of the planetary gearsets 14 and 15, and which drive the two webs 14D and 15D by virtue of their rolling movement in the annular gear 19.

Since the two webs 14D and 15D of the planetary gearsets 14 and 15 are, in turn, connected to the transmission output shafts 11 and 12, the transmission output torque from the main gearbox 6 is distributed between the transmission output shafts 11 and 12 with degrees of distribution determined by the electric machine 16, via the spur gearing 23, the annular gear 19, the satellite gears 14B and 15B, and the webs 14D and 15D.

When the electric machine 16 is not energized, the transmission output torque from the main gearbox 6 delivered via the transmission input shaft 9 to the transmission unit 7 is distributed between the two transmission output shafts 11 and 12 as a function of a basic distribution of the transmission unit 7. This basic distribution is shifted in the direction of an upper and lower limit value of the degree of distribution as a function of a torque delivered by the electric machine.

In addition, in the manner illustrated in FIG. 1, the electric machine 16 can alternatively or simultaneously be brought into active connection both with the transmission unit 7 and with the drive engine 5, via shiftable clutch devices 24 and 25, in such manner that the degree of distribution between the transmission output shafts 11 and 12 of the transmission unit 7 can be varied in the manner described earlier by operating the electric machine 16 from the drive engine 5 in motor mode and also in generator mode, and the electrical energy produced by the electric machine during operation in the generator mode can be stored in an electricity storage medium 26 of the vehicle 1.

In addition, via a further shiftable mechanical coupling device 27, the electric machine 16 can be brought into active connection with a starter ring gear of the drive engine 5 (not shown, and known in itself), to drive the drive engine 5 by electric motor power during a starting process of the drive engine 5 made as an internal combustion engine, so that a starter as provided in conventionally built vehicles and known as such is not needed.

The electric machine 16 is connected to the transmission unit 7 made as an overlap transmission by way of a clutch device 24 preferably made as an electromechanical clutch and, on its side facing away from the transmission unit 7, it is shiftably connected with an original belt drive 28 of the generator in conventional vehicles, via a clutch device 25, preferably also made as an electromechanical clutch.

REFERENCE NUMERALS 1 all-wheel-drive vehicle
2 vehicle axle
3 vehicle axle
4 drive train
5 drive engine, internal combustion engine
6 main gearbox
7 transmission unit
8 device
9 transmission input shaft
10 gearwheel
11 first transmission output shaft, vehicle cross-shaft
12 second transmission output shaft, vehicle cross-shaft
13 other gear wheel
14 first planetary gearset
14A first shaft
14C solar gear
14*b* satellite gear
14*d* web
15 second planetary gearset
15A second shaft
15C solar gear
15*b* satellite gear
15*d* web
16 device, electric machine
17 motor output shaft
18 countershaft
19 annular gear
20 spur gear
21 spur gear
22 spur gear
23 spur gearing
24 first clutch device
25 second clutch device
26 storage medium
27 mechanical coupling device
28 belt drive
29 cross shaft
30 cross shaft
31 longitudinal shaft
32 third shiftable clutch device

The invention claimed is:

1. A vehicle (1) having a drive engine (5) arranged in a transverse direction of the vehicle, the drive engine (5) being drivingly coupled to a main gear box (6) and an output of the main gear box (6), in turn, being drivingly coupled to an input of a transmission unit (7), the transmission unit (7) facilitating variable distribution of supplied by the drive engine (5) to a first output shaft which supports a wheel (2A) and a second output shaft which supports a wheel (2B), the transmission unit (7) comprising a transmission input shaft (9) coupled to the main gear box (6) for supplying torque to the first and the second output shafts via first and second planetary gearsets (14, 15), an electric machine (16) being coupled to the first and second planetary gearsets (14, 15) via first and second interconnected shafts (14A, 15A) to facilitate variable distribution of the torque, delivered by the transmission input shaft (9), between the first and the second output shafts as a function of torque produced by the electric machine (16), and the electric machine (16) being actively connectable with the transmission unit (7), via a first shiftable clutch device (24) connected to a first end of the electric machine (16), and an opposite end of the electric machine (16) also being actively connectable with the drive engine (5), via a second shiftable clutch device (25), so that a degree of distribution of torque between the first and the second output shafts of the transmission device (7) is varied when the electric machine (16)is operating as a motor and also as a generator, and, when the electric machine (16) operates as a generator, the electric machine (16) is driven directly by the drive engine (5) and stores electrical power in a storage medium (26) electrically coupled to the electric machine (16).

2. The transmission unit according to claim 1, wherein, during a starting process o the drive engine (5), a shiftable mechanical coupling device (27) couples the eletric machine (16) with the drive engine (5) for starting the drive engine (5).

3. The transmission unit according to claim 1, wherein the drive engine (5), via the main gear box (6), the transmission unit (7), a third shiftable clutch device (32) and a shaft, drives at least a second transverse vehicle axle (3).

4. A vehicle (1) having a drive engine (5) arranged in a transverse direction of the vehicle, the drive engine (5) being drivingly coupled to an input of a main gear box (6) and an output of the main gear box (6) being drivingly coupled to an input of a transmission unit (7), the transmission unit (7) facilitating variable distribution of drive torque supplied by the drive engine (5) to a first output shaft which supports a wheel (2A) and a second output shaft which supports a wheel (26), the transmission unit (7) comprising a transmission input shaft (9) coupled to the output of the main gear box (6) for supplying torque to the first and the second output shafts via first and second planetary gearsets (14, 15), a single electric machine (16) being coupled to the first and second planetary gearsets (14, 15), via first and second interconnected shafts (14A , 15A), to facilitate variable distribution of the torque, delivered by the transmission input shaft (9), between the first and the second output shafts as a function of torque produced by the electric machine (16), and the electric machine (16) being actively connectable with the first and the second interconnected shafts (14A, 15A), via a first shiftable clutch device (24) connected to a first end of the electric machine (16), and the electric machine (16) also being actively connectable with the drive engine (5), via a second shiftable clutch device (25) which is driven by the drive engine (5) by a belt drive (28), so that a degree of distribution of torque between the first and the second output shafts of the transmission device (7) is varied when the electric machine (16) is operating as a motor and also as a generator, and, when the electric machine (16) operates as a generator, the electric machine (16) is driven directly by the drive engine (5), the second shiftable clutch device (25) and the belt drive (28) and stores electrical power in a storage medium (26) electrically coupled to the electric machine (16).

5. The transmission unit according to claim 4, wherein, during a starting process of the drive engine (5), a shiftable mechanical coupling device (27) couples the electric machine (16) with the drive engine (5) for starting the drive engine (5).

6. The transmission unit according to claim 4, wherein the drive engine (5), via the main gear box (6), the transmission unit (7), a third shiftable clutch device (32) and a longitudinal shaft, drives at least a second transverse vehicle axle (3).

* * * * *